US008380231B2

(12) United States Patent
Riddle et al.

(10) Patent No.: US 8,380,231 B2
(45) Date of Patent: Feb. 19, 2013

(54) SYSTEM AND METHOD FOR MANAGING MESSAGES IN CONVERSATIONAL-TYPE MESSAGING APPLICATIONS

(75) Inventors: Francis Thomas Riddle, Andover, MA (US); John Bennett Parrett, Andover, MA (US)

(73) Assignee: Research In Motion Limited, Waterloo (CA)

( * ) Notice: Subject to any disclaimer, the term of this patent is extended or adjusted under 35 U.S.C. 154(b) by 315 days.

(21) Appl. No.: 12/713,314

(22) Filed: Feb. 26, 2010

(65) Prior Publication Data

US 2011/0086647 A1  Apr. 14, 2011

Related U.S. Application Data

(60) Provisional application No. 61/251,484, filed on Oct. 14, 2009.

(51) Int. Cl.
*H04W 4/12* (2009.01)

(52) U.S. Cl. ....................................... 455/466

(58) Field of Classification Search ............ 455/466, 455/415, 418, 419, 413, 566, 550.1, 565, 455/412.2; 345/173, 156, 169, 473; 715/863, 715/700
See application file for complete search history.

(56) References Cited

U.S. PATENT DOCUMENTS

| 2004/0015548 | A1* | 1/2004 | Lee ............................... 709/204 |
| 2006/0009243 | A1* | 1/2006 | Dahan et al. .................. 455/466 |
| 2007/0004461 | A1* | 1/2007 | Bathina et al. ................ 455/566 |
| 2008/0055264 | A1* | 3/2008 | Anzures et al. ............... 345/173 |
| 2008/0055269 | A1* | 3/2008 | Lemay et al. .................. 345/173 |
| 2008/0057926 | A1* | 3/2008 | Forstall et al. ................ 455/415 |
| 2009/0029680 | A1* | 1/2009 | Fang ........................... 455/412.2 |
| 2009/0271490 | A1* | 10/2009 | Seitz ............................. 709/206 |
| 2010/0162133 | A1* | 6/2010 | Pascal et al. .................. 715/752 |

OTHER PUBLICATIONS

Achaea—Dreams of Divine Lands; 3.7 Channels and using them; http://www.achaea.com/irex/helpview/help.php?q=channel; Achaea Multi User Dungeon; Accessed from the internet Dec. 30, 2009.
Achaea—Dreams of Divine Lands; 3.3 The Tell Command; http://www.achaea.com/irex/helpview/help.php?id=474; Achaea Multi User Dungeon; Accessed from the internet Dec. 30, 2009.
Merge MSN chat history logs by date & time; hitp://www.tothepc.com/archives/merge-msn-chat-history-logs-by-date-time/; Accessed from the internet Dec. 30, 200.

* cited by examiner

*Primary Examiner* — Melody Mehrpour
(74) *Attorney, Agent, or Firm* — Novak Druce + Quigg LLP

(57) ABSTRACT

A system and method are provided for managing messages in conversational-type messaging applications. To provide continuity across all conversations with a particular recipient, an existing or not-yet-created 1:1 conversation can be populated with 1:Many messages that include the same recipient in the list of addressees. In this way, any 1:1 chat or conversation with a particular recipient will contain all correspondences with that recipient, regardless of whether the message was sent or received in a 1:1 or 1:Many context. As such, the user has access to all information that has been exchanged with that recipient in one messaging screen to avoid the need to traverse multiple messaging screens to obtain the context or information related to the recipient that the user requires.

27 Claims, 13 Drawing Sheets

SYSTEM AND METHOD FOR MANAGING MESSAGES IN CONVERSATIONAL-TYPE MESSAGING APPLICATIONS

This application claims priority from U.S. Provisional Patent Application No. 61/251,484 filed on Oct. 14, 2009, the contents of which are incorporated herein by reference.

TECHNICAL FIELD

The following relates to systems and methods for managing messages in conversational-type messaging applications.

BACKGROUND

Conversational-type messaging applications such as short message service (SMS)—also referred to commonly as "text messaging", multimedia messaging service (MMS) for larger messages, and instant messaging (IM) have become popular methods by which to exchange messages with one or more recipients or contacts, also commonly referred to as "buddies". Often, such messaging applications enable a user to exchange messages one-to-one with a single recipient or buddy, or one-to-many with a group of recipients or buddies.

BRIEF DESCRIPTION OF THE DRAWINGS

Embodiments will now be described by way of example only with reference to the appended drawings wherein.

DETAILED DESCRIPTION OF THE DRAWINGS

Figure 1:
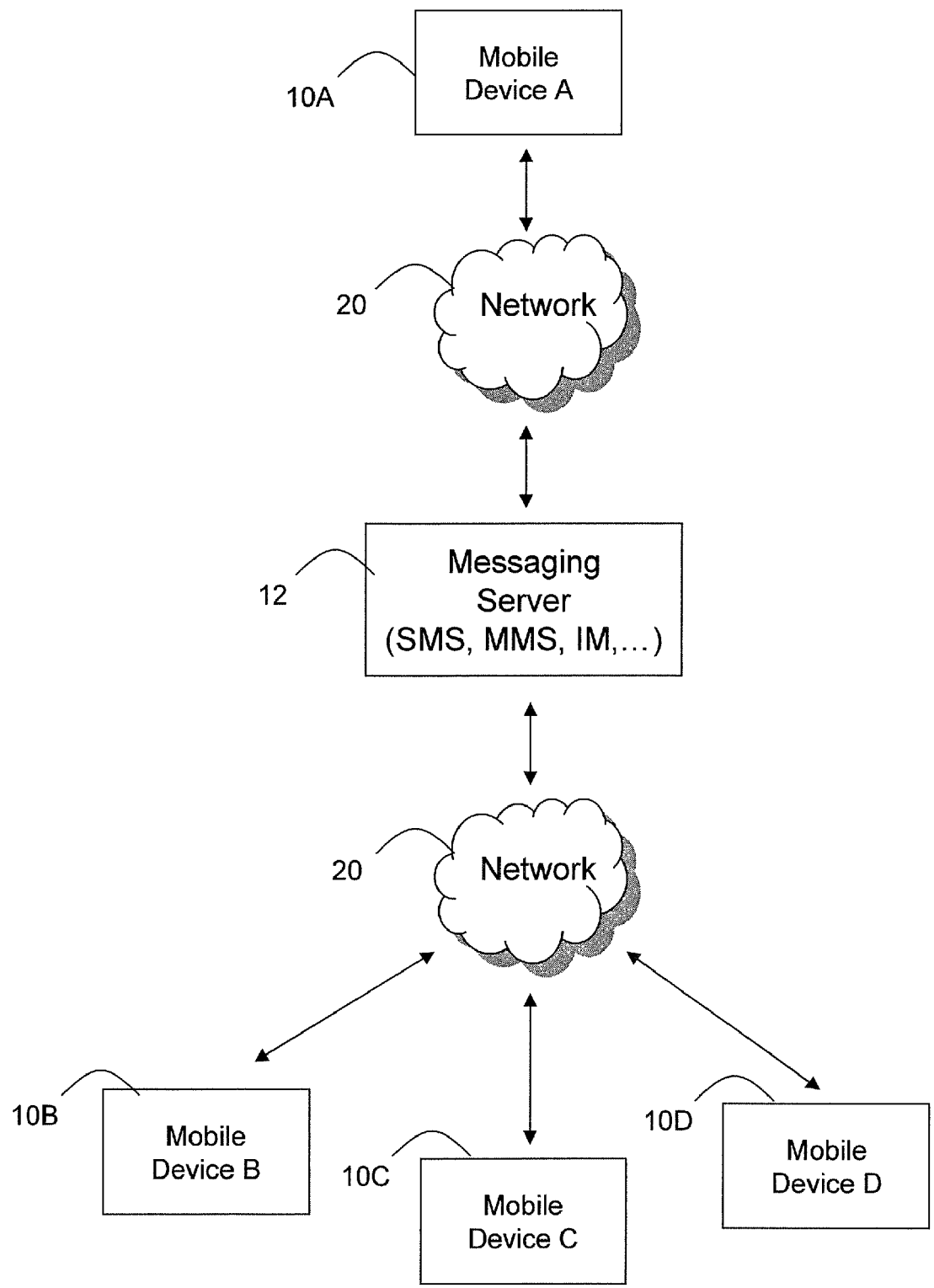
FIG. 1 is block diagram of an example messaging server accessible via a network for messaging between mobile devices.

Users of conversational-type messaging applications are typically provided with the capability to carry on both one-to-one (1:1) conversations or "chats" with a single recipient, and one-to-many (1:Many) conversations with multiple recipients. In some situations, the user may be exchanging messages with the same recipient in both 1:1 and 1:Many environments at the same time. This can lead to confusion if the user cannot remember whether certain information was provided in a 1:Many or 1:1 context and the user may need to therefore search within multiple conversations to find information and context. To provide continuity across all conversations with a particular recipient, an existing or not-yet-created 1:1 conversation can be populated with 1:Many messages that include the same recipient in the list of addressees. In this way, any 1:1 chat or conversation with a particular recipient will contain all correspondences with that recipient, regardless of whether the message was sent or received in a 1:1 or 1:Many context. As such, the user has access to all information that has been exchanged with that recipient in one messaging screen to avoid the need to traverse multiple messaging screens to obtain the context or information related to the recipient that the user requires. Moreover, a single access point can be created for each recipient that includes all correspondence with that recipient for later use rather than determine which of the possibly many conversations may include the information or context desired. It has been found that organizing and managing messages in this way can be applied to any conversational-type messaging application, including without limitation: SMS, MMS, and IM.

The following principles can be applied to any computing device configured to provide a conversational-type messaging application, include both desktop computing devices and mobile devices such as laptops, smart phones, PDAs, etc. For the sake of illustration, the following examples will be provided in the context of mobile devices, referred to commonly by numeral 10 as shown in FIG. 1.

The mobile device 10 can be a two-way communication device with advanced data communication capabilities including the capability to communicate with other mobile devices 10 or computer systems through a network of transceiver stations. The mobile device 10 may also have the capability to allow voice communication. Depending on the functionality provided by the mobile device 10, it may be referred to as a smart phone, data messaging device, a two-way pager, a cellular telephone with data messaging capabilities, a wireless Internet appliance, or a data communication device (with or without telephony capabilities). The mobile device 10 can also be one that is used in a system that is configured for continuously routing all forms of pushed information from a host system to the mobile device 10 (not shown).

In FIG. 1, mobile devices 10 are configured to exchange messages in a conversational-style via a messaging server 12, for example an SMS center (SMSC) within a carrier's infrastructure, which delivers messages to the mobile phone number of the destination device. The SMSC would also be configured to hold onto messages and deliver then once the destination device is within coverage. In this example, the messaging server 12 when acting as an SMSC supports 1:Many SMS messages by accepting messages with more than one recipient address and sending out multiple copies of the message, i.e. one to each recipient. In other embodiments, the messaging server 12 may handle MMS or IM exchanges as is well known in the art and thus further details thereof may be omitted. In the example shown in FIG. 1, a first mobile device, namely Mobile Device A referred to by numeral 10A sends messages through the messaging server 12 via access provided by a network 20, e.g. a wireless network. Mobile device 10A in this example is capable of carrying on conversational-type message exchanges with three buddies, namely mobile device 10B, mobile device 10C, and mobile device 10D, which correspond to Users B, C, and D respectively. The mobile devices 10B, 10C, and 10D may also obtain connectivity with the messaging server 12 via the network 20, but it will be appreciated that other networks (not shown) may be used. FIG. 1 provides one example to illustrate the management of 1:1 and 1:Many SMS messages for mobile devices 10 but it will be appreciated that the principles discussed below can be equally applied to any conversational-type messaging application.

Figure 2:
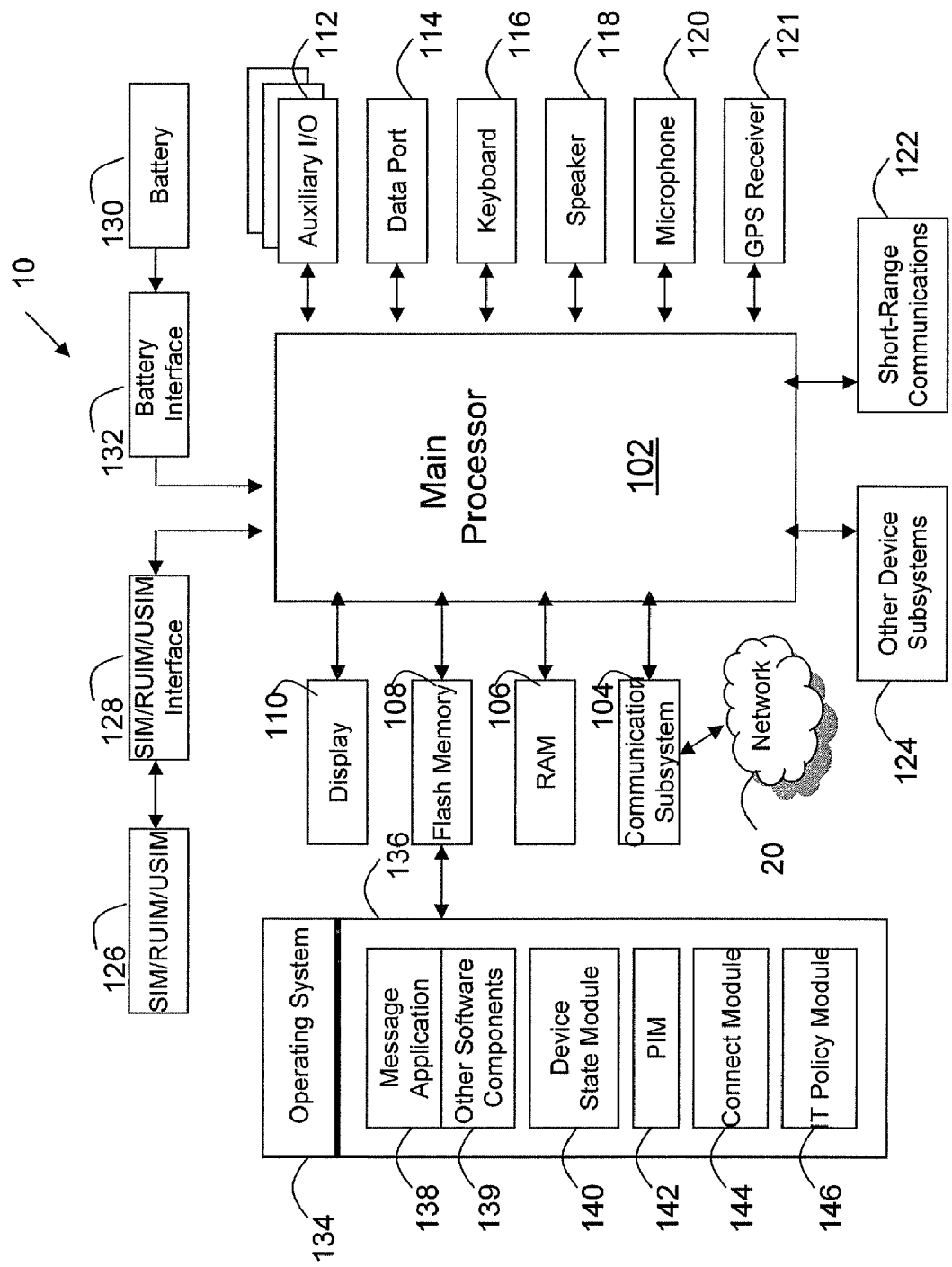
FIG. 2 is an example block diagram of a mobile device.
Figure 3:
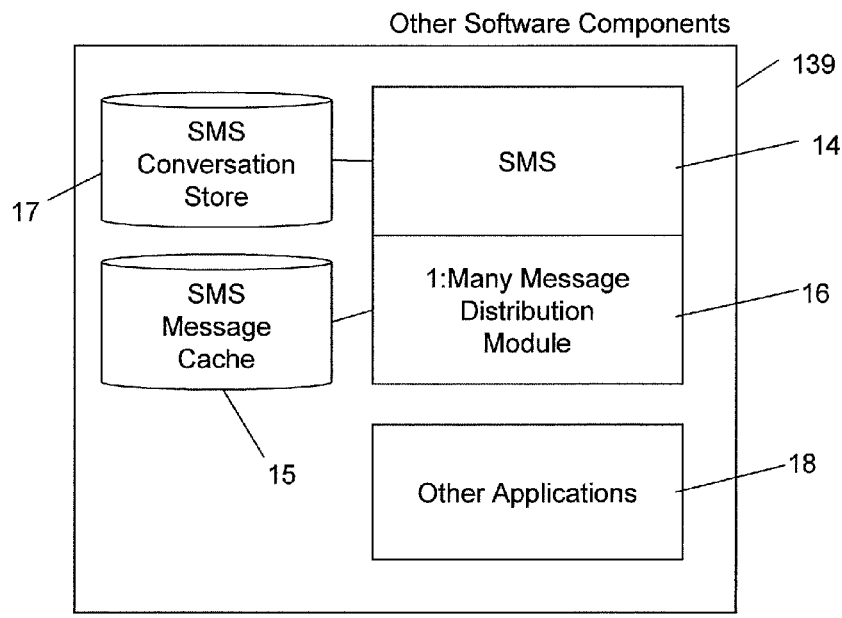
FIG. 3 is a block diagram illustrating example other software components shown in FIG. 2.

An example configuration for a mobile device 10 is shown in FIGS. 2 and 3.

Referring first to FIG. 2, shown therein is a block diagram of an embodiment of a mobile device 10. The mobile device 10 comprises a number of components such as a main processor 102 that controls the overall operation of the mobile device 10. Communication functions, including data and voice communications, are performed through a communication subsystem 104. The communication subsystem 104 receives messages from and sends messages to a wireless network 20. In this example embodiment of the mobile device 10, the communication subsystem 104 is configured in accordance with the GSM and GPRS standards, which are used worldwide. Other communication configurations that are equally applicable are the 3G and 4G networks discussed above. New standards are still being defined, but it is believed that they will have similarities to the network behaviour described herein, and it will also be understood by persons skilled in the art that the embodiments described herein are intended to use any other suitable standards that are developed in the future. The wireless link connecting the communication subsystem 104 with the wireless network 20 represents one or more different Radio Frequency (RF) channels, operating according to defined protocols specified for GSM/GPRS communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, a GPS receiver 121, short-range communications 122, and other device subsystems 124. The short-range communications 122 can implement any suitable or desirable device-to-device or peer-to-peer communications protocol capable of communicating at a relatively short range, e.g. directly from one device to another. Examples include Bluetooth®, ad-hoc WiFi, infrared, or any "long-range" protocol re-configured to utilize available short-range components. It will therefore be appreciated that short-range communications 122 may represent any hardware, software or combination of both that enable a communication protocol to be implemented between devices or entities in a short range scenario, such protocol being standard or proprietary.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 20, and device-resident functions such as a calculator or task list.

The mobile device 10 can send and receive communication signals over the wireless network 20 after required network registration or activation procedures have been completed. Network access is associated with a subscriber or user of the mobile device 10. To identify a subscriber, the mobile device 10 may use a subscriber module component or "smart card" 126, such as a Subscriber Identity Module (SIM), a Removable User Identity Module (RUIM) and a Universal Subscriber Identity Module (USIM). In the example shown, a SIM/RUIM/USIM 126 is to be inserted into a SIM/RUIM/USIM interface 128 in order to communicate with a network. Without the component 126, the mobile device 10 is not fully operational for communication with the wireless network 20. Once the SIM/RUIM/USIM 126 is inserted into the SIM/RUIM/USIM interface 128, it is coupled to the main processor 102.

The mobile device 10 is typically a battery-powered device and in this example includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Software applications may include a message application 138, a device state module 140, a Personal Information Manager (PIM) 142, a connect module 144 and an IT policy module 146. A message application 138 can be any suitable software program that allows a user of the mobile device 10 to send and receive electronic messages, wherein messages are typically stored in the flash memory 108 of the mobile device 10. A device state module 140 provides persistence, i.e. the device state module 140 ensures that important device data is stored in persistent memory, such as the flash memory 108, so that the data is not lost when the mobile device 10 is turned off or loses power. A PIM 142 includes functionality for organizing and managing data items of interest to the user, such as, but not limited to, e-mail, text messages, instant messages, contacts, calendar events, and voice mails, and may interact with the wireless network 20. A connect module 144 implements the communication protocols that are required for the mobile device 10 to communicate with the wireless infrastructure and any host system 25, such as an enterprise system, that the mobile device 10 is authorized to interface with. An IT policy module 146 receives IT policy data that encodes the IT policy, and may be responsible for organizing and securing rules such as the "Set Maximum Password Attempts" IT policy.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc. The additional applications 139 can be loaded onto the mobile device 10 through at least one of the wireless network 20, the auxiliary I/O subsystem 112, the data port 114, the short-range communications subsystem 122, or any other suitable device subsystem 124.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

For voice communications, received signals are output to the speaker 118, and signals for transmission are generated by the microphone 120. Although voice or audio signal output is accomplished primarily through the speaker 118, the display 110 can also be used to provide additional information such as the identity of a calling party, duration of a voice call, or other voice call related information.

The main processor 102 can also control a backlight 36 for conserving battery life when the mobile device 10 is locked or otherwise not in use (e.g. in a holster). The backlight 36 can be used to illuminate the display 110 when the mobile device 10 is being used. The backlight 36 can be associated with an idle timer 34 such that an idle time can be tracked and if it reaches or exceeds a certain predetermined threshold (or user definable threshold), the backlight 36 is turned off. As will be explained below, the idle timer 34 can also be used to provide a current idle time to the main processor 102 for other uses such as to determine inactivity of the user. The main processor 102 may also utilize data provided by an orientation sensor 35. The orientation sensor 35 may comprise an inclinometer or other sensor capable of determining the orientation of the mobile device 10 with respect to a datum.

For composing data items, such as e-mail messages, for example, a user or subscriber could use a touch-sensitive overlay (not shown) on the display 110 that is part of a touch screen display (not shown), in addition to possibly the auxiliary I/O subsystem 112. The auxiliary I/O subsystem 112 may include devices such as: a mouse, track ball, infrared fingerprint detector, or a roller wheel with dynamic button pressing capability. A composed item may be transmitted over the wireless network 20 through the communication subsystem 104.

FIG. 3 shows an example of the other software applications and components 139 that may be stored on and used with the mobile device 10. In this example, the other software components 139 include an SMS application 14 that includes or otherwise has access to or communicates with a 1:Many message distribution module 16, which may hereinafter be referred as: "the message distribution module 16" for brevity. The message distribution module 16 includes or otherwise has access to an SMS message cache 15 which, as will be explained in greater detail below, can be used to hold copies of various outgoing messages from 1:Many messages in order to populate 1:1 conversations with corresponding recipients. The SMS application 14 in this example also has access to an SMS conversation store 17 for storing conversations and their messages. Also shown in FIG. 3 are other applications 18 which may refer to any other software application or component that is either pre-installed or user-installed on the mobile device 10 as is well known in the art.

Figure 4:
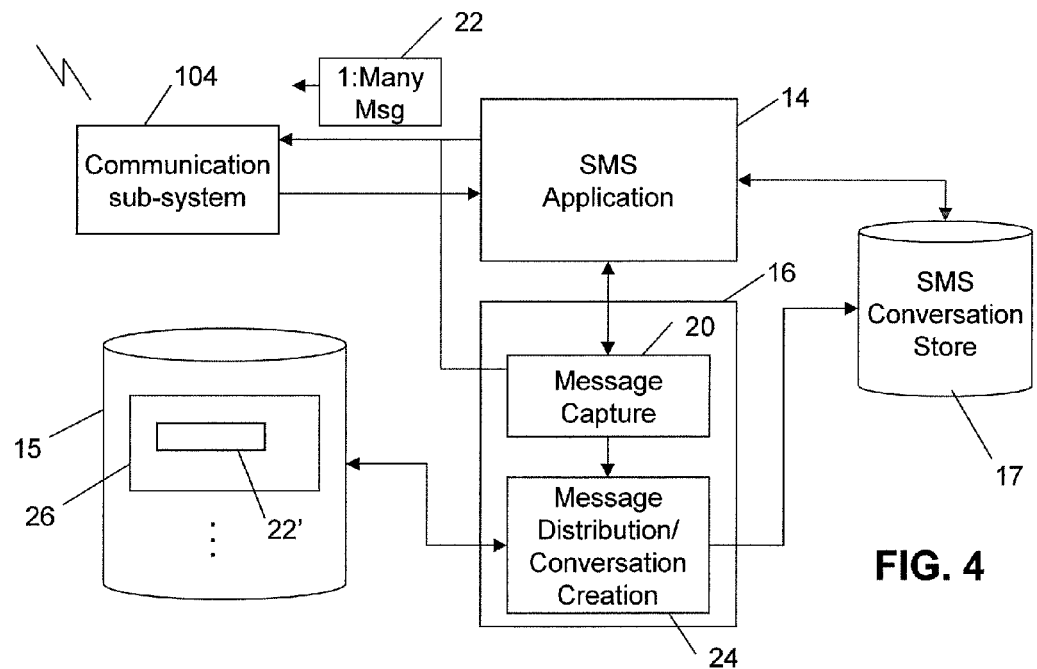
FIG. 4 is a block diagram illustrating an example configuration for operating the message distribution module shown in FIG. 3.

FIG. 4 illustrates further detail of one example configuration for the message distribution module 16. As can be seen in FIG. 4, the SMS application utilizes the mobile device 10 to exchange messages via the communication sub-system 104, which include 1:Many messages 22 which are those that are addressed and thus sent to more than one recipient. The message distribution module 16 comprises a message capture function 20 which is configured to capture outgoing 1:Many messages 22, e.g. by intercepting, or monitoring and copying, etc. As noted above, a 1:Many message 22 enables multiple recipient addresses to be specified and the messaging server 12 sends multiple copies of the message 22, one to each recipient. In over-the-air protocols such as these, the principles discussed herein are particularly advantageous since outgoing messages can be sent as 1:Many but would be replied to (and thus incoming messages would be) in a 1:1 fashion.

The message capture function 20 communicates with the SMS application 14 to obtain current conversation lists to determine whether or not a 1:1 conversation exists for each other recipient referenced in the 1:Many message 22. The message capture function 20 utilizes a message distribution and conversation creation function 24 to either distribute copies of the 1:Many messages 22 to each applicable existing 1:1 conversation or to hold a copy in the SMS message cache 15 until one is created or until it otherwise creates a new conversation. As shown in FIG. 4, a record 26 can be created for each recipient for which a 1:1 conversation does not currently exist which can act as a container for copies 22' of 1:Many messages 22 for the corresponding recipient. In this way, when a new 1:1 conversation is created (either by the user or automatically using the message distribution and conversation creation function 24), the records 26 can be referenced and if one exists for a corresponding recipient, the copies 22' can be extracted and populated in the new 1:1 conversations. It can be appreciated that if a 1:1 conversation does not already exist, a new one could be created and populated at this time. Therefore, in general, upon obtaining a message for a plurality of recipient addresses, a 1:1 conversation can be populated with the message, whether an existing one or a new one.

Figure 5:
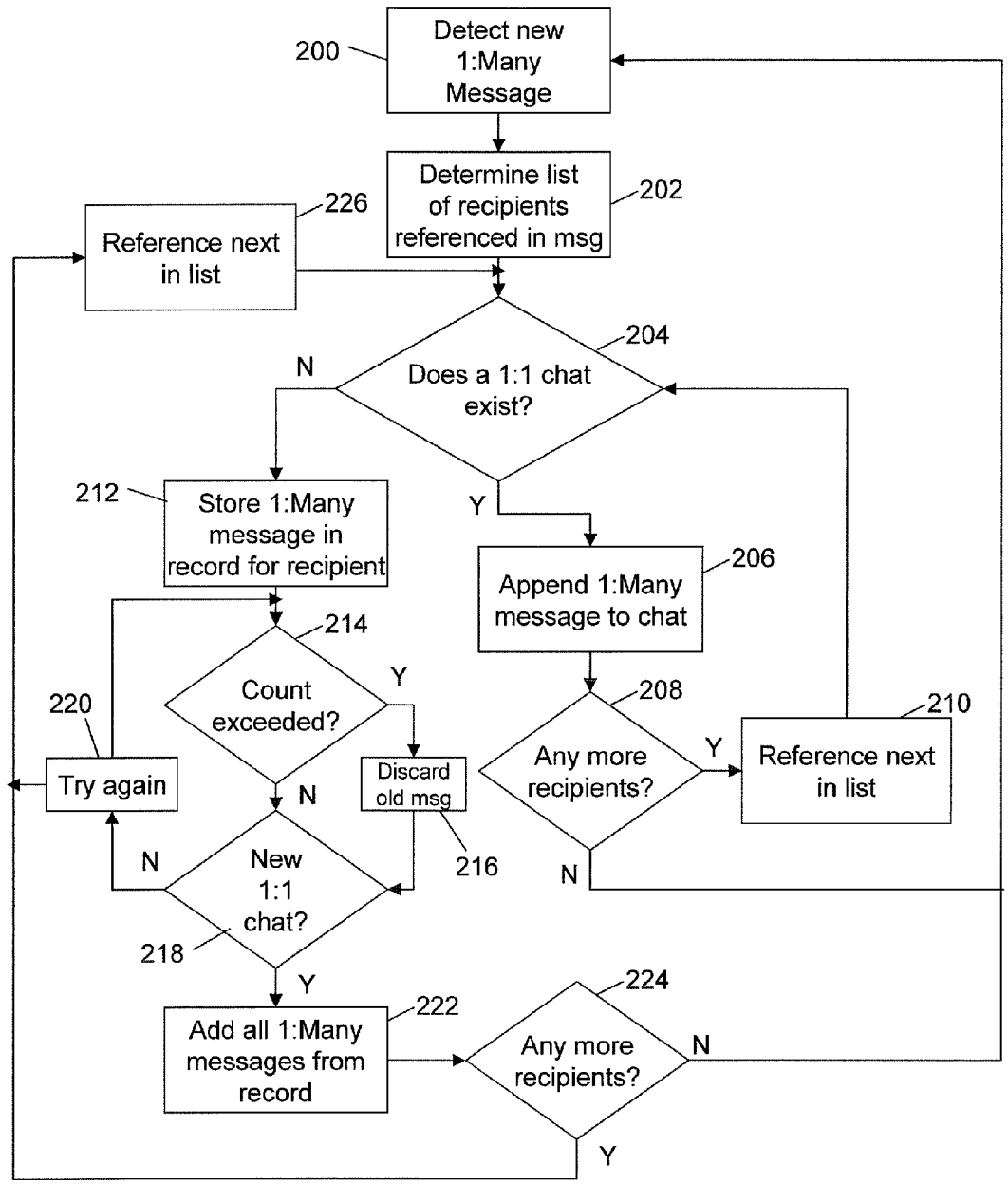
FIG. 5 is a flow chart showing example computer executable instructions for utilizing the message distribution module shown in FIG. 4.
Figure 6:
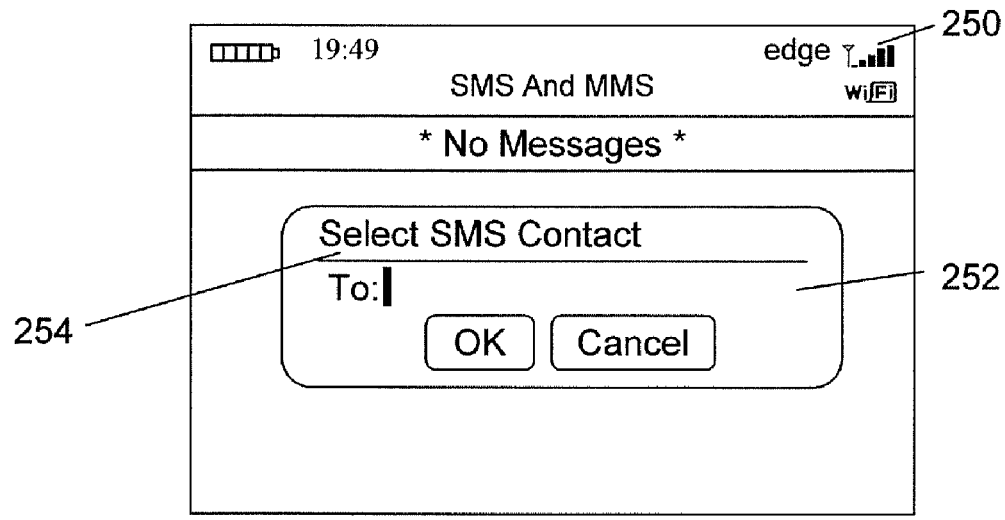
FIGS. 6 to 11 are screen shots of example graphical user interfaces (GUIs) for generating a 1:1 SMS message.

FIG. 5 illustrates an example set of computer executable instructions for distributing 1:Many messages 22 to existing and newly created conversations. At 200, the message distribution module 16 detects a new 1:Many message 22, e.g. by intercepting and copying outgoing 1:Many messages 22 or by obtaining copies in some other suitable manner. The copy of the new 1:Many message 22 is then examined to determine a list of recipient addresses (e.g. contacts, phone numbers, etc.) referenced in the 1:Many message 22, i.e. all recipients for an outgoing or sent 1:Many message 22. Each recipient in the list determined at 202 is then examined. Beginning with the first recipient, the message distribution module 16 determines at 204 if a 1:1 chat with that recipient already exists or is "ongoing" in the SMS conversation store 17. If so, the 1:Many message 22 is appended to the existing chat at 206. In other words the existing chat can be populated with the 1:Many message 22. The message distribution module 16 then determines at 208 if the list includes any more recipients and, if so, the next recipient is referenced at 210 and 204 is repeated. If the list does not include any more recipients, the operations are finished until a new 1:Many message 22 is detected at 200.

If the recipient being examined at 204 does not have an existing 1:1 chat (i.e. a 1:1 chat is not ongoing with the recipient), the 1:Many message 22 is held, saved or otherwise stored in a record for that recipient at 212. In this way, the 1:Many message 22 can be held as "pending" to be added to a 1:1 chat if and when it is created in the future. In this example, to avoid overburdening the memory of the mobile device 100, the message distribution module 16 can limit the number of 1:Many messages 22 held pending for each recipient, according to a predetermined number, e.g. a threshold of eight messages. In such embodiments, as shown in FIG. 5, the message distribution module 16 can reference the record for that recipient (if it already exists) and determine if the predetermined number would be exceeded. If so, one or more relatively older 1:Many messages 22 can be discarded at 216 to make room for the new 1:Many message 22. If the count has not been exceeded (or for example, the count is set to unlimited by user preferences or according to the type of recipient), the message distribution module 16 can check again at 218 to determine if a new 1:1 chat has been created. This can be done after a certain delay or can be done immediately before looping to try again at 200 as desired. It can be appreciated that the message distribution module 16 may also be configured to itself create the chats and thus may not need to perform an explicit "check" in some embodiments. This can be repeated until a new 1:1 conversation is detected or, in other embodiments, after a certain amount of time, a new 1:1 conversation can be automatically created (not shown). It can be appreciated that the loop including 220 can spin off into a separate routine while the next recipient in the list is referenced at 226. Once a new 1:1 chat is determined at 218, all 1:Many messages included in the record 26 are appended to the 1:1 chat at 222. It can be appreciated that instead of caching 1:Many messages until a new 1:1 chat is created, a new 1:1 chat could be generated automatically. In such embodiments, a count may or may not be used as desired. The message distribution module 16 then determines at 224 if there are any additional recipients to reference (e.g. if new chat is created automatically or happens to be created simultaneously). If there are no more recipients to reference, the process ends until a new 1:Many message 22 is detected at 200. If there are additional recipients, the next one in the list may be referenced at 226.

The steps or operations in the flow charts described herein are just for example. There may be many variations to these steps or operations without departing from the principles described herein. For instance, the steps may be performed in a differing order, or steps may be added, deleted, or modified.

Turning now to FIGS. 6 through 21, various screen shots of an SMS/MMS user interface are shown to further illustrate an example implementation of the message distribution module 16 or equivalently configured module (e.g. within the SMS application 14).

Figure 7:
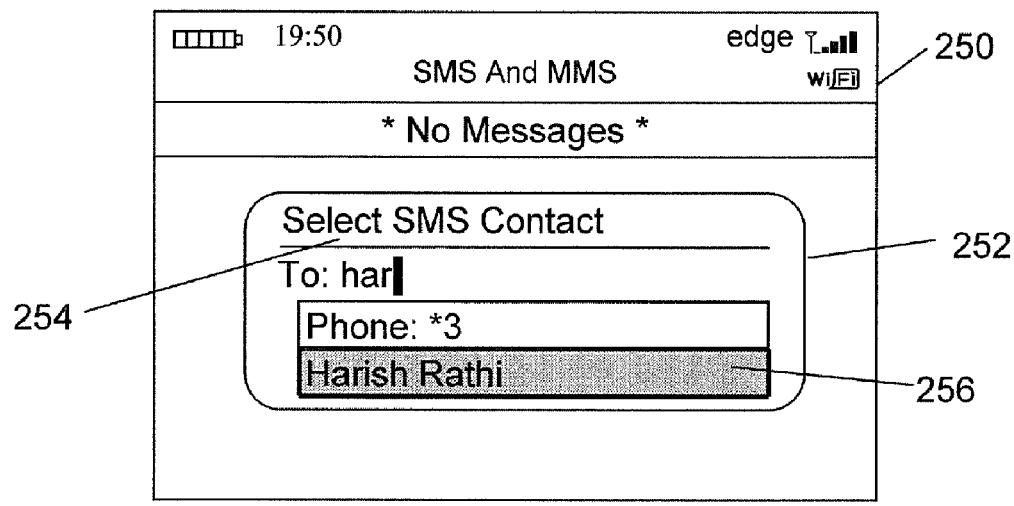
Figure 8:
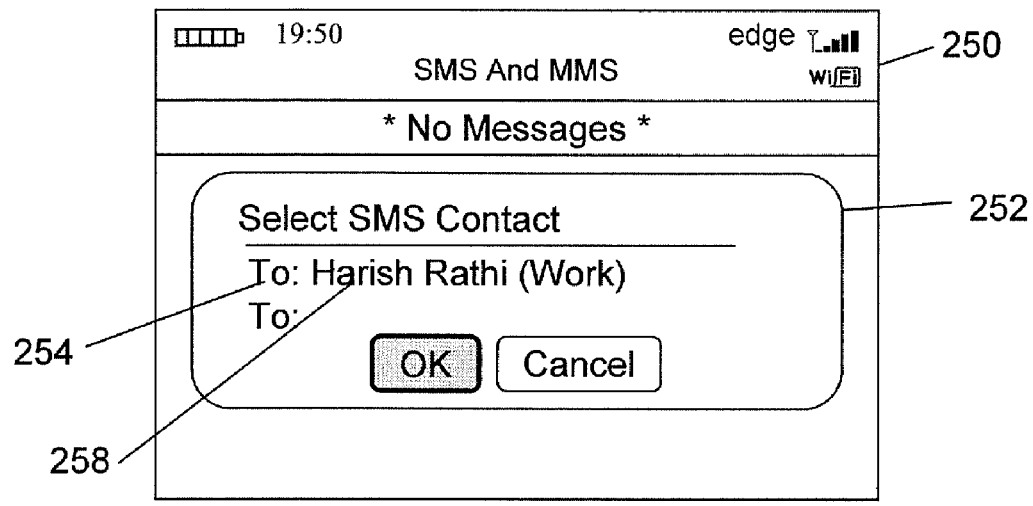
Figure 9:
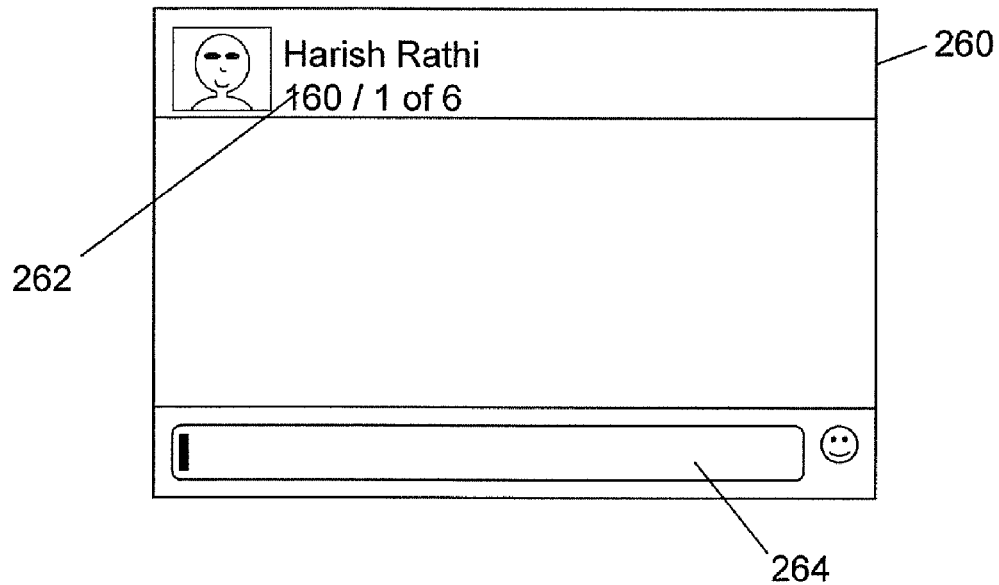
Figure 10:
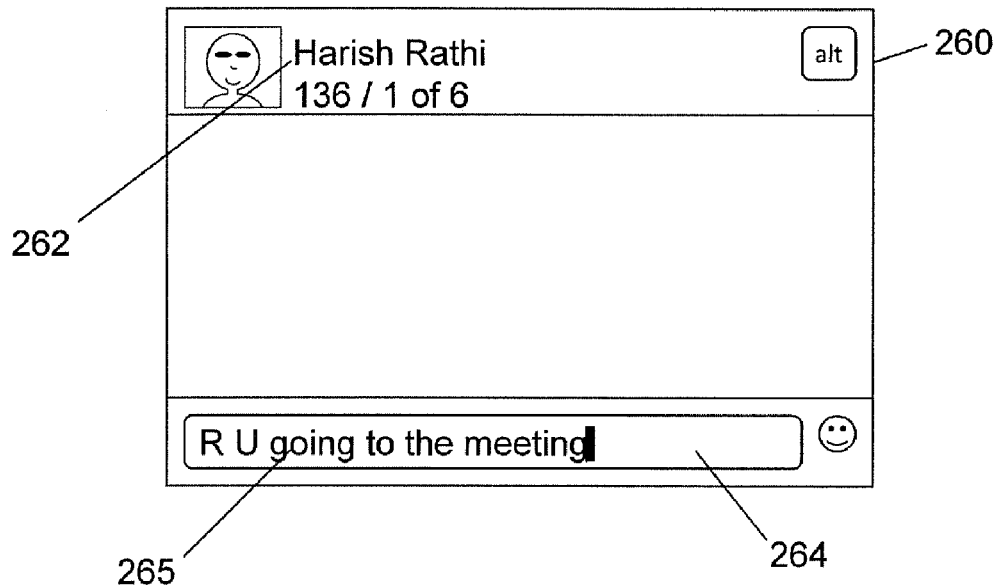
Figure 11:
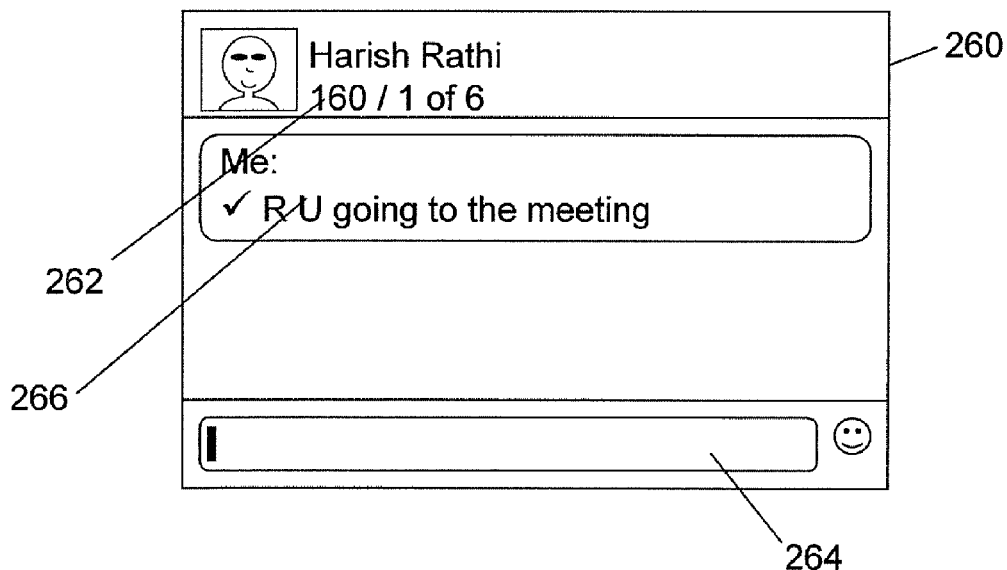

FIGS. 6 to 11 illustrate the composition of a new 1:1 message and thus 1:1 chat from an SMS/MMS message/chat list screen 250 (hereinafter the message list screen 250). A contact selection window 252 is used to enter a contact in an contact entry portion 254. As shown in FIG. 7, a lookup function 256 can be used to find a contact in a local address book or a global address list (neither shown) and a desired contact selected to complete the entry portion 254 as shown in FIG. 8. As also shown in FIG. 8, when a contact is selected and the entry portion 254 populated, a next entry portion 258 is created, which enables a 1:Many message 22 and chat to be created. FIG. 9 illustrates a 1:1 chat screen 260, for the 1:1 chat, which in this example shows an avatar or contact photo from an address book along with the contact name. The number of characters remaining 262 for the message being composed may also be included in the chat screen 260 as shown to notify the user of how many additional characters are permitted in the message being composed. A message entry portion 264 is displayed at the bottom of the screen 260. A composed message 265 is shown in FIG. 10, which can be sent by detecting a suitable user input, for example, as a result of selecting an enter key, pressing a trackball, selection using a stylus etc. A sent message 266 is shown in FIG. 11, which identifies the sender.

Figure 12:
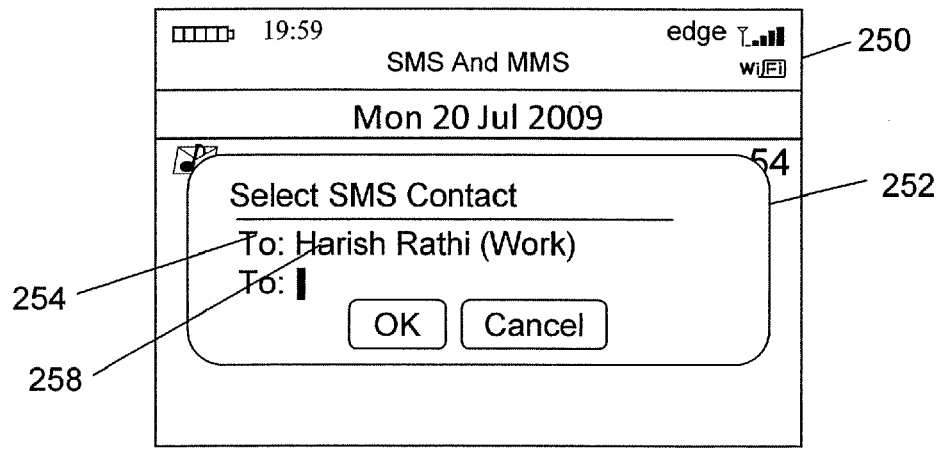
FIGS. 12 to 17 are screen shots of example GUIs for generating a 1:Many SMS message.
Figure 13:
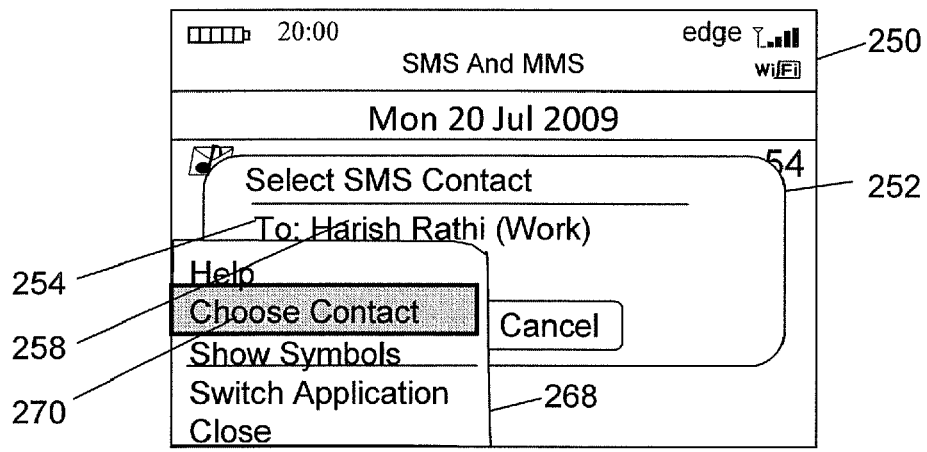
Figure 14:
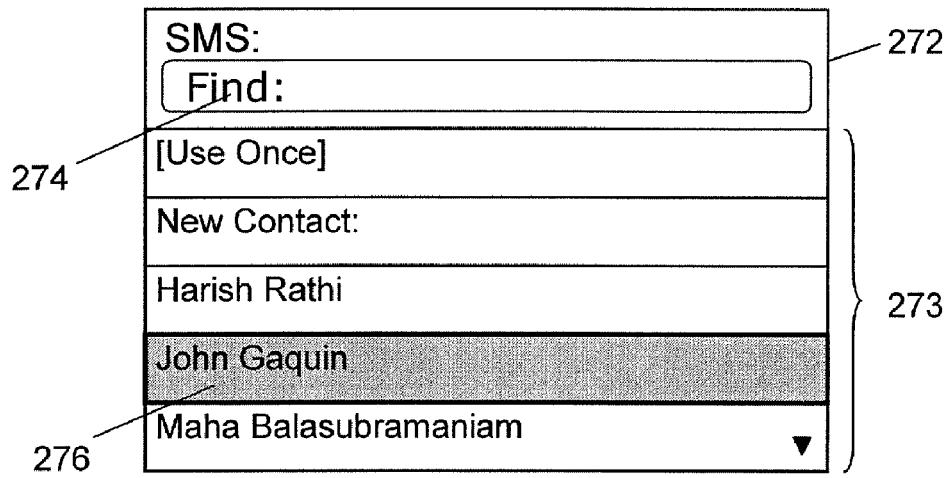
Figure 15:
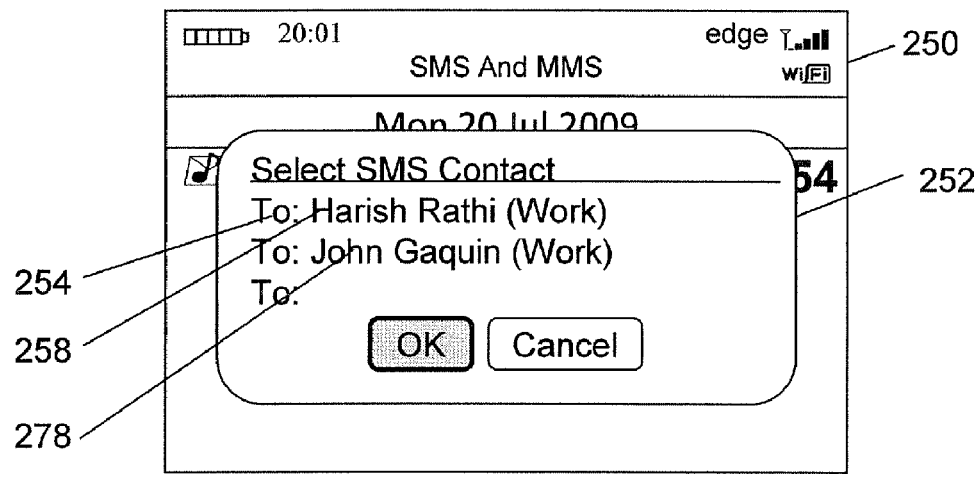

FIGS. 12 to 17 illustrate the composition of a new 1:Many message 22. FIG. 12 is similar to FIG. 6 but in this example, as shown in FIG. 13, a second recipient is selected. For the second recipient, rather than using the lookup function 256, a menu 268 is invoked which includes a Choose Contact option 270. By selecting the Choose Contact option 270, a contact list screen 272 is displayed as shown in FIG. 14, which includes a list of contact entries 273. A find tool 274 is also displayed to enable the user to search for a contact in the list of entries 273. In this example, the desired contact 276 is found by scrolling through the list of entries 273 and highlighting the desired contact 276. By selecting the desired contact 276, a second recipient is populated in the contact selection window 252 as shown in FIG. 15. By having more than one recipient, the message to be composed will be a 1:Many message 22.

Figure 16:
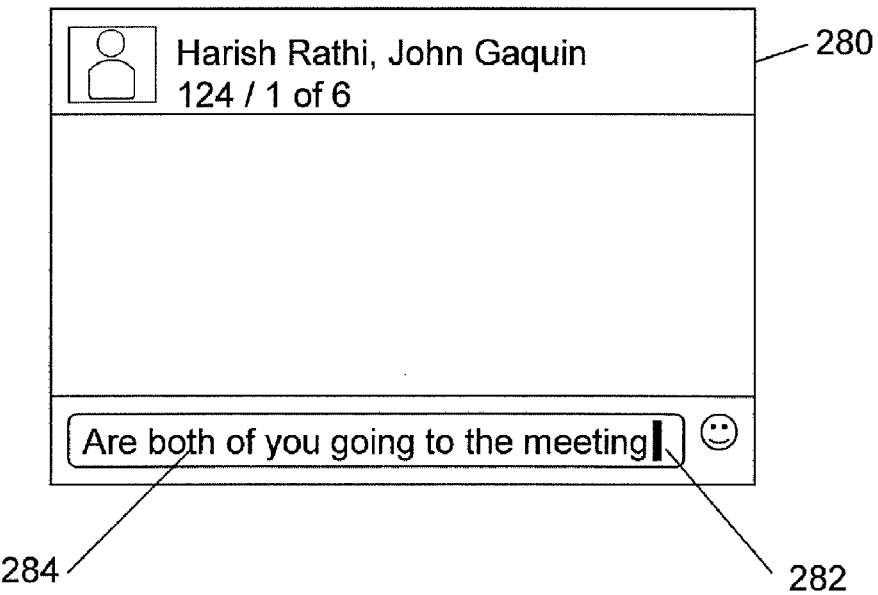
Figure 17:
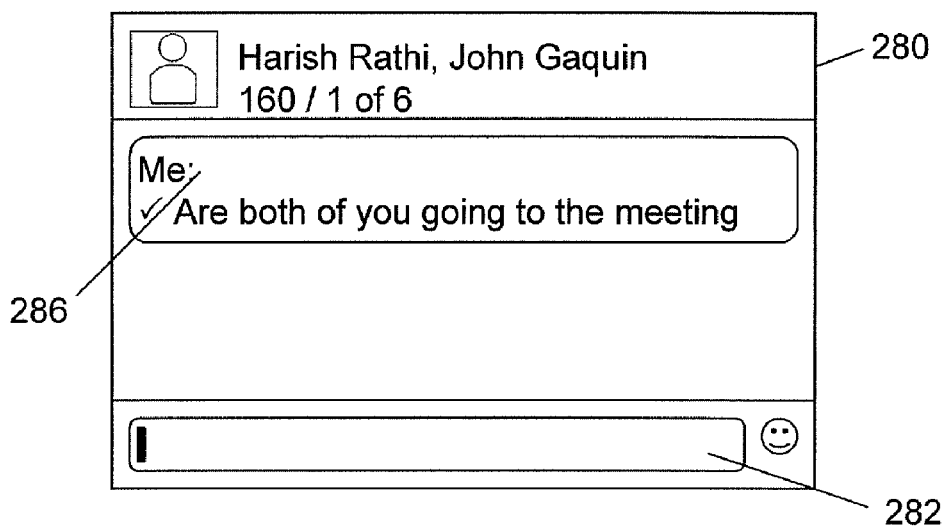

A 1:Many message screen 280 is shown in FIG. 16 for the selected recipients. A message entry portion 282 can be used to enter text in composition of a 1:Many message 22 as shown. Once the 1:Many message 22 has been sent, the 1:Many message screen 280 is updated as shown in FIG. 17 to include the sent 1:Many message 286.

Figure 18:
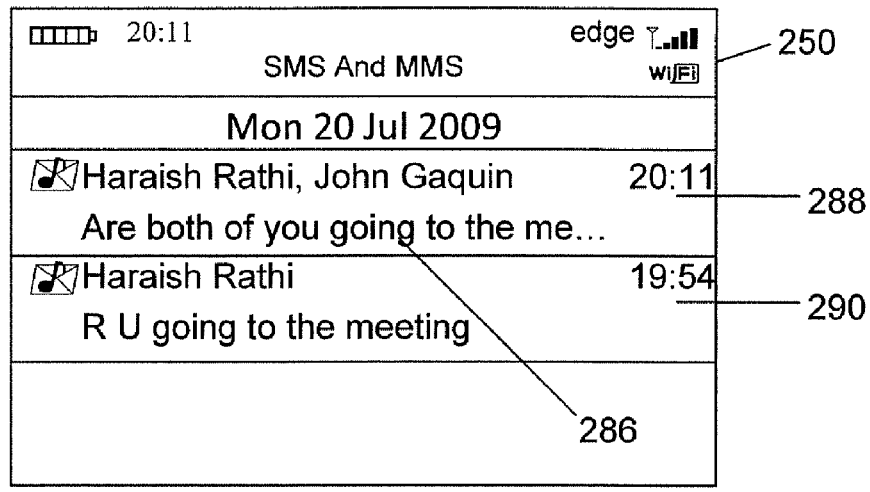
FIG. 18 is a screen shot of an example GUI for an SMS message list.
Figure 19:
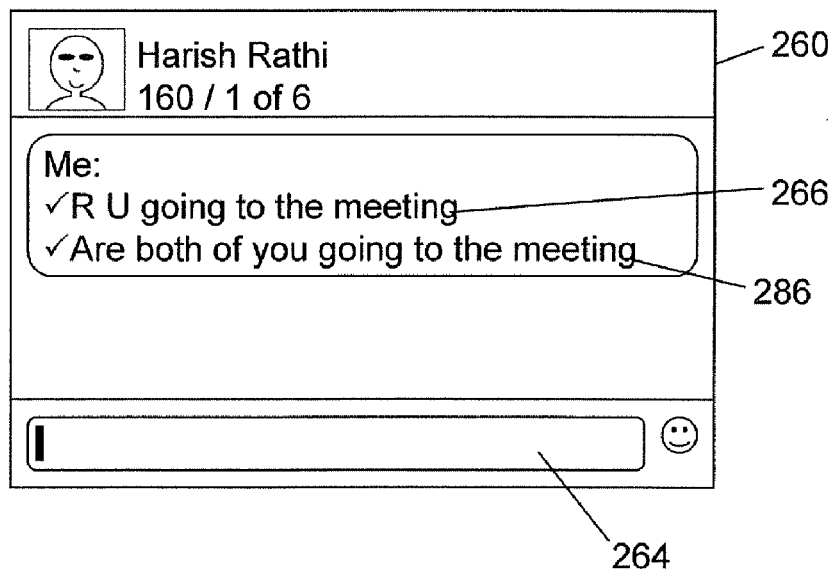
FIGS. 19 and 20 are screen shots of example GUIs illustrating the population of a 1:1 chat with a 1:Many message.
Figure 20:
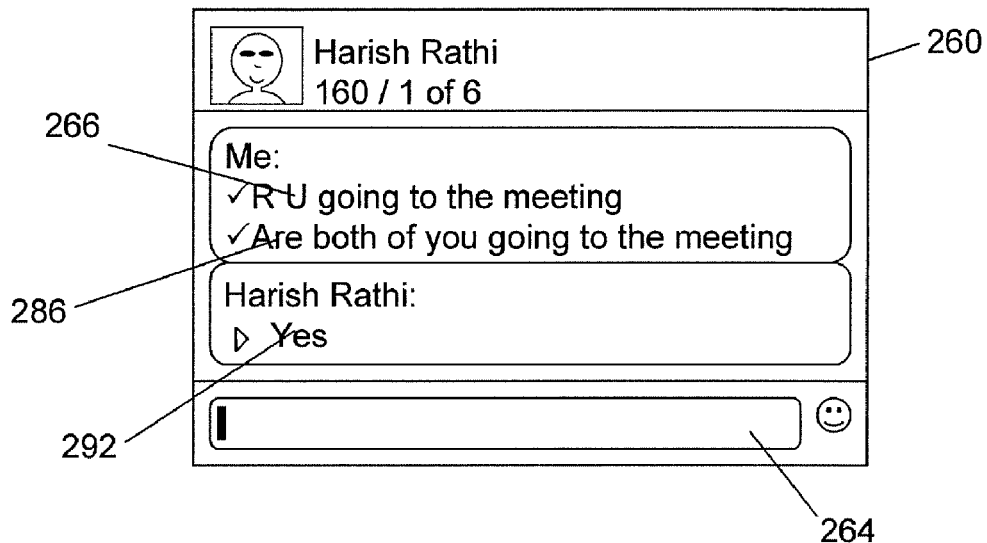

FIG. 18 illustrates an updated message list screen 250, which shows both an entry 290 for the 1:1 chat, and an entry 288 for the 1:Many message 286 from this example. By invoking the message distribution module 16 upon sending the 1:Many message 22 shown in FIG. 17, the 1:1 chat screen 260 can be updated to also include the sent 1:Many message 286 as shown in FIG. 19. FIG. 20 illustrates a new 1:1 message 292 in the 1:1 chat screen 260. In this example, the user would be able to see that two different messages 266, 286 were sent to Harish Rathi concerning attending the meeting.

Figure 21:
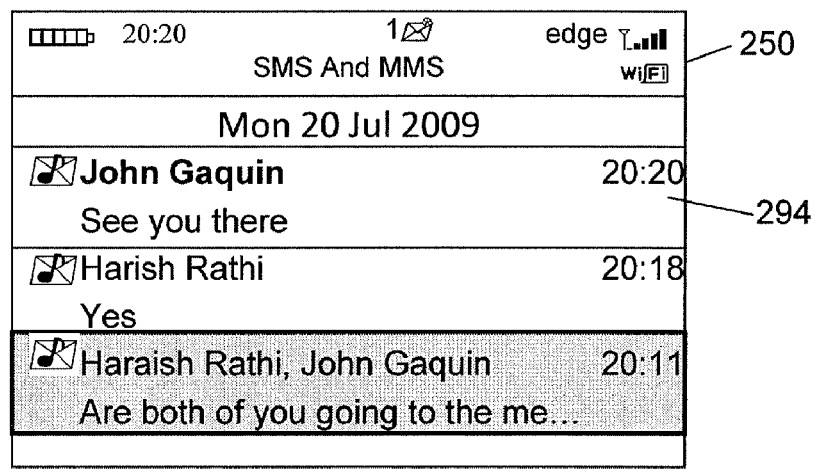
FIG. 21 is a screen shot an example GUI illustrating a new 1:1 chat.
Figure 22:
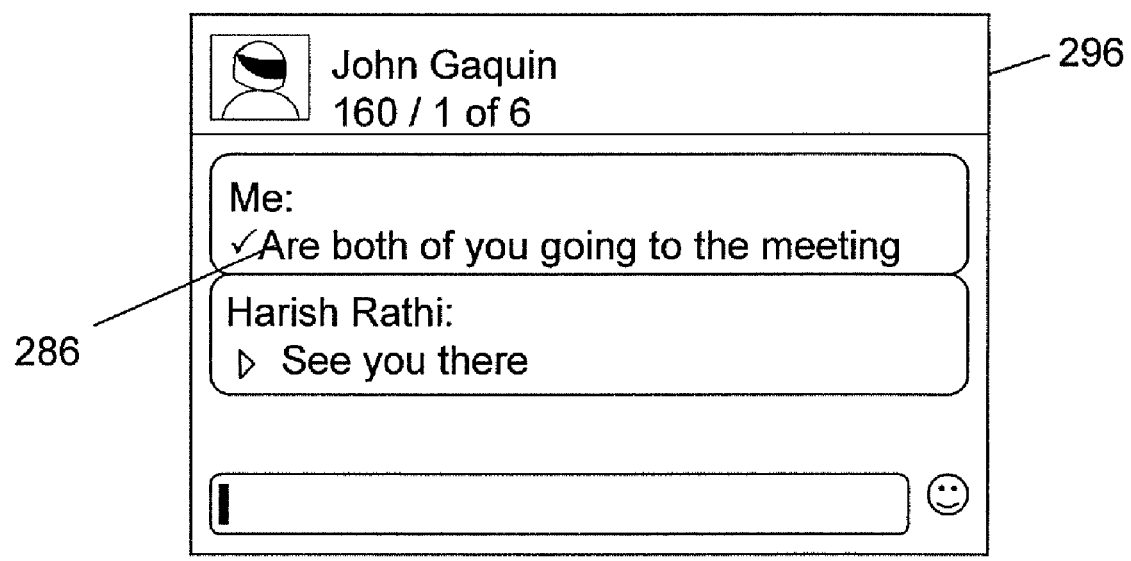
FIG. 22 is a screen shot showing the new 1:1 chat listed in the GUI of FIG. 21.

FIG. 21 illustrates a further updated chat screen 250 upon receipt of a new 1:1 message from John Gaquin and thus creation of a new 1:1 chat 294. As shown in FIG. 22, the new 1:1 conversation screen 296 includes the previously sent 1:Many message 286. Accordingly, a copy of the 1:Many message 286 was held pending until a new 1:1 chat with John Gaquin (the other receipt) was created and the message 286 was then appended in the new chat. This enables context from other conversations to be shared in other conversations with that contact.

It can be appreciated that the principles illustrated in the context of SMS can be equally applied to MMS and IM as noted above.

Although the above principles have been described with reference to certain specific embodiments, various modifications thereof will be apparent to those skilled in the art without departing from the scope of the claims appended hereto.

The invention claimed is:

1. A method for messaging comprising:
   obtaining a message for a plurality of recipient addresses;
   if there is an existing one-to-one conversation with a respective one of said plurality of recipient addresses, incorporating said message into said existing one-to-one conversation; and
   if one-to-one conversation with a respective one of said plurality of recipient addresses does not exist, incorporating said message into a new one-to-one conversation with said respective one of said plurality of recipient addresses after detecting an input creating said new one-to-one conversation.

2. The method according to claim 1, further comprising determining if said existing one-to-one conversation exists by examining each recipient address in said message, wherein if more than one of said plurality of recipient addresses does not have a corresponding one-to-one conversation, said method is repeated for each of said more than one of said plurality of recipient addresses.

3. The method according to claim 1, further comprising, prior to detecting said input:
   obtaining at least one additional message for a plurality of recipient addresses;
   determining that a one-to-one conversation with one of said plurality of recipient addresses does not exist; and
   storing said at least one additional message.

4. The method according to claim 1, wherein said obtaining comprises either detecting the message as it is being sent, or detecting the message as it is received.

5. The method according to claim 1, wherein said message is an outgoing short message service message being sent to a plurality of short message service recipient addresses.

6. The method according to claim 1, wherein said message is an Instant Message being sent to a plurality of Instant Messaging recipient addresses.

7. The method according to claim 1, further comprising saving said message to a record for said one of said recipient addresses.

8. The method according to claim 7, wherein only up to a predetermined number of messages can be saved and, if said predetermined number is exceeded, said method comprising deleting at least one older message already having been saved.

9. A non-transitory computer readable medium comprising computer executable instructions for messaging comprising instructions for:
   obtaining a message for a plurality of recipient addresses;
   if there is an existing one-to-one conversation with a respective one of said plurality of recipient addresses, incorporating said message into said existing one-to-one conversation; and
   if a one-to-one conversation with a respective one of said plurality of recipient addresses does not exist, incorporating said message into a new one-to-one conversation with said respective one of said plurality of recipient addresses after detecting an input creating said new one-to-one conversation.

10. The non-transitory computer readable medium according to claim 9, further comprising instructions for determining if said existing one-to-one conversation exists by examining each recipient address in said message, wherein if more than one of said plurality of recipient addresses does not have a corresponding one-to-one conversation, said method is repeated for each of said more than one of said plurality of recipient addresses.

11. The non-transitory computer readable medium according to claim 9, further comprising instructions for, prior to detecting said input:
   obtaining at least one additional message for a plurality of recipient addresses;
   determining that a one-to-one conversation with one of said plurality of recipient addresses does not exist; and
   storing said at least one additional message.

12. The non-transitory computer readable medium according to claim 9, wherein said obtaining comprises either detecting the message as it is being sent, or detecting the message as it is received.

13. The non-transitory computer readable medium according to claim 9, wherein said message is an outgoing short message service message being sent to a plurality of short message service recipient addresses.

14. The non-transitory computer readable medium according to claim 9, wherein said message is an Instant Message being sent to a plurality of Instant Messaging recipient addresses.

15. The non-transitory computer readable medium according to claim 9, further comprising instructions for saving said message to a record for said one of said recipient addresses.

16. The non-transitory computer readable medium according to claim 15, wherein only up to a predetermined number of messages can be saved and, if said predetermined number is exceeded, said method comprising deleting at least one older message already having been saved.

17. A mobile device configured for messaging by:
   obtaining a message for a plurality of recipient addresses;
   if there is an existing one-to-one conversation with a respective one of said plurality of recipient addresses, incorporating said message into said existing one-to-one conversation; and
   if a one-to-one conversation with a respective one of said plurality of recipient addresses does not exist, incorporating said message into a new one-to-one conversation with said respective one of said plurality of recipient addresses after detecting an input creating said new one-to-one conversation.

18. The mobile device according to claim 17 further configured for determining if said existing one-to-one conversation exists by compriscG examining each recipient address in said message, wherein if more than one of said plurality of recipient addresses does not have a corresponding one-to-one conversation, said method is repeated for each of said more than one of said plurality of recipient addresses.

19. The mobile device according to claim 18, further configured for, prior to detecting said input:
   obtaining at least one additional message for a plurality of recipient addresses;
   determining that a said one-to-one conversation with one of said plurality of recipient addresses does not exist; and
   storing said at least one additional message.

20. The mobile device according to claim 17, wherein said message is an outgoing short message service message being sent to a plurality of short message service recipient addresses.

21. The mobile device according to claim 17, further configured for saving said message to a record for said one of said recipient addresses.

22. The mobile device according to claim 21, wherein only up to a predetermined number of messages can be saved and, if said predetermined number is exceeded, said method comprising deleting at least one older message already having been saved.

23. The mobile device according to claim 17, wherein said message is an Instant Message being sent to a plurality of Instant Messaging recipient addresses.

24. The mobile device according to claim 19, wherein said obtaining comprises either detecting the message as it is being sent, or detecting the message as it is received.

25. The method according to claim 1, further comprising incorporating said message into a conversation with said plurality of recipient addresses.

26. The non-transitory computer readable medium according to claim 9, further comprising instructions for incorporating said message into a conversation with said plurality of recipient addresses.

27. The mobile device according to claim 17, further configured for incorporating said message into a conversation with said plurality of recipient addresses.

* * * * *

UNITED STATES PATENT AND TRADEMARK OFFICE
CERTIFICATE OF CORRECTION

| | |
|---|---|
| PATENT NO. | : 8,380,231 B2 |
| APPLICATION NO. | : 12/713314 |
| DATED | : February 19, 2013 |
| INVENTOR(S) | : Francis Thomas Riddle and John Bennett Parrett |

It is certified that error appears in the above-identified patent and that said Letters Patent is hereby corrected as shown below:

In the Claims:

Column 10 line 20, "...exists by compriscG examining each recipient..." should read "...exists by examining each recipient..."

Signed and Sealed this
Twenty-eighth Day of May, 2013

Teresa Stanek Rea
*Acting Director of the United States Patent and Trademark Office*